(12) United States Patent
Laxmanan et al.

(10) Patent No.: US 8,583,408 B2
(45) Date of Patent: Nov. 12, 2013

(54) STANDARDIZED MODELING SUITE

(75) Inventors: Kasilingam Basker Laxmanan,
Newark, DE (US); Yudong Chen,
Wilmington, DE (US); Gerald F. Parise,
Moorestown, NJ (US); Lewis Ray Ware,
Hockessin, DE (US)

(73) Assignee: Bank of America Corporation,
Charlotte, NC (US)

( * ) Notice: Subject to any disclaimer, the term of this patent is extended or adjusted under 35 U.S.C. 154(b) by 355 days.

(21) Appl. No.: 13/050,086

(22) Filed: Mar. 17, 2011

(65) Prior Publication Data

US 2012/0239375 A1 Sep. 20, 2012

(51) Int. Cl.
*G06G 7/48* (2006.01)
(52) U.S. Cl.
USPC ............................................. 703/6; 705/7.37
(58) Field of Classification Search
USPC ................. 703/2, 22, 6, 13; 434/335; 705/10, 705/14.66, 38, 7.37; 707/749; 345/440; 706/12
See application file for complete search history.

(56) References Cited

U.S. PATENT DOCUMENTS

| 7,702,616 | B1 | 4/2010 | Li et al. |
| 7,730,079 | B2 | 6/2010 | Meijer et al. |
| 2002/0127529 | A1* | 9/2002 | Cassuto et al. ................ 434/335 |
| 2005/0234698 | A1* | 10/2005 | Pinto et al. ....................... 703/22 |
| 2006/0143071 | A1* | 6/2006 | Hofmann ......................... 705/10 |
| 2008/0091390 | A1* | 4/2008 | Samardzija et al. .............. 703/2 |
| 2008/0117213 | A1* | 5/2008 | Cirit et al. ....................... 345/440 |
| 2009/0234799 | A1 | 9/2009 | Betawadkar-Norwood et al. |
| 2009/0299896 | A1* | 12/2009 | Zhang et al. .................... 705/38 |
| 2010/0057651 | A1* | 3/2010 | Fung et al. ....................... 706/12 |
| 2011/0040666 | A1* | 2/2011 | Crabtree et al. ................. 705/37 |
| 2011/0072024 | A1* | 3/2011 | Barney .......................... 707/749 |
| 2011/0258049 | A1* | 10/2011 | Ramer et al. ............... 705/14.66 |

OTHER PUBLICATIONS

Wikipedia, "Variance inflation factor", 2013.*
https://onlinecourses.science.psu.edu/stat501, Detecting multicollinearity using variance inflation factorsz', 2013.*
Wu et al. "Spatial analysis of bioavailable soil lead concentrations in Los Angeles, California", Environmental Research, 2010.*

* cited by examiner

*Primary Examiner* — Kandasamy Thangavelu
(74) *Attorney, Agent, or Firm* — Banner & Witcoff, Ltd.; Michael A. Springs

(57) ABSTRACT

An enhanced modeling tool associated with an entity may facilitate end-to-end modeling of problems in any application space. The enhanced modeling tool may collect modeling data from a variety of sources, check the collected data, find the best predictor variables for a given target variable, estimate the model, implement the model, and validate the model. The output of each of these steps may be in a standardized format to allow other steps to directly incorporate the output. An additional feature of the system may include a reporting capability that generates supporting documents related to model governance and risk compliance.

19 Claims, 14 Drawing Sheets

Variable A Details and Usage

Top   Usage info   Availability   Back to var list

Basic information:
- *Label:* Credit Score
- *Usage type:* Predictor
- *Source:* Credit Bureau Data
- *Special formatting:* none
- *Treatment:* none Usage information:
- Usage Details Here Top   Basic info   Availability   Back to var list Data Availability, Month by Month:

| Yr/Mon | 01 | 02 | 03 | 04 | 05 | 06 | 07 | 08 | 09 | 10 | 11 | 12 |
|--------|----|----|----|----|----|----|----|----|----|----|----|----|
| 2011   | Y  | Y  | Y  | Y  | N  | N  | N  | N  | N  | N  | N  | N  |

FIG. 4b

```
* >>>>> Begin _d2_RcDy TrvTran calculation (Days since last travel transaction.) ;
if n( LTD_CQ, LTD_TA, LTD_TR, LTD_TH, LTD_TF, LTD_TT, LTD_TO ) = 0 then _d2_RcDy_TrvTran = 0 ;
else do ;
        d2_RcDy_TrvTran = max( LTD_CQ, LTD_TA, LTD_TR, LTD_TH, LTD_TF, LTD_TT, LTD_TO ) ;
    if _d2_RcDy_TrvTran = 0 then _d2_RcDy_TrvTran = 0 ;
    else
            _d2_RcDy_TrvTran = 366 - ( Process_Dt - _d2_RcDy_TrvTran ) ;
    end ;
* >>>>> Require Process_Dt LTD_CQ LTD_TA LTD_TR LTD_TH LTD_TF LTD_TT LTD_TO ;
* >>>>> End _d2_RcDy_TrvTran calculation ;
```

```
* >>>>> Begin Auto_MissInd1 calculation code. ;
Auto_MissInd1 = ( AGO_CCFIVE_CYCLE_13 = . ) ;
label Auto_MissInd1 = 'Missing indicator dummy for AGO_CCFIVE_CYCLE_13' ;
* >>>>> Require AGO_CCFIVE_CYCLE_13 ;
* >>>>> End Auto_MissInd1 calculation code. ;

* >>>>> Begin AGO_CCFIVE_CYCLE_13 ceiling, floor, and missing code. ;
if AGO_CCFIVE_CYCLE_13 > 1 then AGO_CCFIVE_CYCLE_13 = 1 ;
else if . < AGO_CCFIVE_CYCLE_13 < 0 then AGO_CCFIVE_CYCLE_13 = 0 ;
%macro SkipMiss ; %global SkipMiss ;
%if &SkipMiss ^= Y %then %str(
else if AGO_CCFIVE_CYCLE_13 = . then AGO_CCFIVE_CYCLE_13 =       0 ;
) ; %mend SkipMiss ; %SkipMiss ;
* >>>>> Require AGO_CCFIVE_CYCLE_13 ;
* >>>>> End AGO_CCFIVE_CYCLE_13 ceiling, floor, and missing code. ;
```

Independent variables sorted by Maximum Likelihood Chi² p-value.

Target variable: Y Sample size: 84,149

[Create List of Checked Variables] Warning: Check boxes cleared if this page is sorted!

| * | Var # | Independent Variable (c=character var.) | Chi² p-val | Chi² | Chi² p-val Rank | Inf. Value | Inf. Value Rank | KS | KS Rank | Avg. Cum. Lift | Avg. Lift Rank |
|---|---|---|---|---|---|---|---|---|---|---|---|
| ☐ | 1 | Variable A | 0.000 | 3525.16 | 1 | 0.1833 | 1 | 0.1710 | 3 | 0.0432 | 2 |
| ☐ | 2 | Variable B | 0.000 | 3503.10 | 2 | 0.1820 | 2 | 0.1719 | 2 | 0.0445 | 1 |
| ☐ | 3 | Variable C | 0.000 | 3310.18 | 3 | 0.1722 | 3 | 0.1674 | 6 | 0.0420 | 3 |
| ☐ | 4 | Variable D | 0.000 | 3021.40 | 4 | 0.1555 | 4 | 0.1703 | 4 | 0.0281 | 14 |
| ☐ | 5 | Variable E | 0.000 | 2997.11 | 5 | 0.1549 | 5 | 0.1691 | 5 | 0.0281 | 13 |
| ☐ | 6 | Variable F | 0.000 | 2894.77 | 6 | 0.1492 | 6 | 0.1616 | 7 | 0.0406 | 4 |
| ☐ | 7 | Variable G | 0.000 | 2591.89 | 7 | 0.1320 | 7 | 0.1731 | 1 | 0.0211 | 17 |
| ☐ | 8 | Variable H | 0.000 | 2534.36 | 8 | 0.1299 | 8 | 0.1515 | 9 | 0.0368 | 6 |
| ☐ | 9 | Variable I | 0.000 | 2529.64 | 9 | 0.1296 | 9 | 0.1510 | 10 | 0.0389 | 5 |
| ☐ | 10 | Variable J | 0.000 | 2349.46 | 10 | 0.1194 | 11 | 0.1703 | 4 | 0.0318 | 8 |
| ☐ | 11 | Variable K | 0.000 | 2336.55 | 11 | 0.1205 | 10 | 0.1422 | 11 | 0.0362 | 7 |

FIG. 7

```
* >>>>> Begin Interaction Variable coding. ;
* >>>>> Interactions found significant 2 time(s) out of 10 samples. ;
Interaction_001 = ATT_159*BKO_SCORE ;
    label Interaction_001 = "Interaction: ATT_159*BKO_SCORE " ;
Interaction_002 = BKO_SCORE*Acq_TM ;
    label Interaction_002 = "Interaction: BKO_SCORE*Acq_TM " ;
Interaction_003 = FICO_SCORE*BKO_SCORE ;
    label Interaction_003 = "Interaction: FICO_SCORE*BKO_SCORE " ;
* >>>>> Interactions found significant 1 time(s) out of 10 samples. ;
Interaction_004 = ATT_159*ATT_046 ;
    label Interaction_004 = "Interaction: ATT_159*ATT_046 " ;
Interaction_005 = ATT_159*Occ_SEmp ;
    label Interaction_005 = "Interaction: ATT_159*Occ_SEmp " ;
```

```
* >>>>> Begin shift code. ;
cresp12 = cresp12 * ( cresp12 > 0 ) + .01 ;
fgroup12 = fgroup12 * ( fgroup12 > 0 ) + .01 ;
fresp12 = fresp12 * ( fresp12 > 0 ) + .01 ;
V10 = V10 * ( V10 > 0 ) + .01 ;
f12_mcg = f12_mcg * ( f12_mcg > 0 ) + .01 ;
V18 = V18 * ( V18 > 0 ) + .01 ;
cgroup12 = cgroup12 * ( cgroup12 > 0 ) + .01 ;
ct12 = ct12 * ( ct12 > 0 ) + .01 ;
V20 = V20 * ( V20 > 0 ) + .01 ;
V26 = V26 * ( V26 > 0 ) + .01 ;
V33 = V33 * ( V33 > 0 ) + .01 ;
* >>>>> End shift code. ;
* >>>>> Begin f(x) transform code. ;
XFracTerm6_J1P1 = fresp12 ** 0.5 ;
   label XFracTerm6_J1P1 = 'Transform: fresp12 ** 0.5' ;
XFracTerm9_J1P1 = f12_mcg ** 0.5 ;
   label XFracTerm9_J1P1 = 'Transform: f12_mcg ** 0.5' ;
XFracTerm11_J1P1 = V18 ** 0.5 ;
   label XFracTerm11_J1P1 = 'Transform: V18 ** 0.5' ;
* >>>>> End f(x) transform code. ;
```

FIG. 11

```
* >>>>> Begin XBeta equation. ;
_XBeta = -2.1765388112233+
  ( 0.5234502126181 * Sect_MCD ) +
  ( 0.7965608298409 * everpre ) +
  ( -0.6622958744449 * fresp12 ) +
  ( -0.30133817158 * Sect_MCB ) +
  ( 0.04973974941311 * V10 ) +
  ( 0.09303047744179 * f12_mcg ) +
  ( -0.389241488057 * nomail12 ) +
  ( 0.0873654078544 * cgroup12 ) +
  ( 0.1862430532518 * ct12 ) +
  ( 9.625708884843E-7 * V33 ) ;

&Score = exp(_XBeta ) / ( 1 + exp(_XBeta ) ) ;
* >>>>> End XBeta equation. ;

* >>>>> Begin Rank assignment code. ;
if      &Score > 0.365113688385    then &Rank = 1 ;
else if &Score > 0.2657151880237   then &Rank = 2 ;
else if &Score > 0.2156191756844   then &Rank = 3 ;
else if &Score > 0.179603556693    then &Rank = 4 ;
else if &Score > 0.1494655748936   then &Rank = 5 ;
else if &Score > 0.1261406229076   then &Rank = 6 ;
else if &Score > 0.1041334178998   then &Rank = 7 ;
else if &Score > 0.0824630465015   then &Rank = 8 ;
else if &Score > 0.066008028285    then &Rank = 9 ;
else                                    &Rank = 10 ;
* >>>>> End Rank assignment code. ;
```

FIG. 12

STANDARDIZED MODELING SUITE

TECHNICAL FIELD

Aspects of the invention generally relate to a standardized toolkit for modeling statistical processes. In particular, various aspects of the invention include a framework supporting end-to-end model development.

BACKGROUND

Individuals and organizations use modeling to better understand processes that occur in the real world. For instance, an airline company may model the dynamics of forces on an airplane as it experiences various wind conditions. Alternatively, a car manufacturer may model the fuel consumption of an automobile under various loads. Further still, a marketing organization may want to model certain types of consumer behavior for one of its clients.

Computers are often used for modeling problems of any appreciable difficulty. With recent advances in computing systems, modeling of complex problems has become even more tractable. However, conventional modeling solutions are often targeted towards solving either a specific problem or handling a specific task in the end-to-end modeling process.

Because of these constraints, modelers have often had to cope with using multiple software packages altogether and/or suboptimal interfaces for communication between the various modeling modules, such as those for data gathering and/or model estimation. In these instances, modelers are frustrated by inefficiencies built into the modeling process; for instance, modelers may need to waste time formatting the output from one module so that data can be fed into a subsequent module to arrive at the modeled solution. In addition, modelers may be further hindered by insufficient automation and/or personalization available through the use of conventional modeling programs.

Therefore, there is a need for an end-to-end standardized modeling solution for creating models in any application domain.

BRIEF SUMMARY

In light of the foregoing background, the following presents a simplified summary of the present disclosure in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

Aspects of the disclosure address one or more of the issues mentioned above by disclosing methods, non-transitory computer readable media, and apparatuses for automating and supporting various stages of model development, including data gathering, data checking, variable reduction, model estimation, and reporting. Data gathering may refer to the collection of data from various sources whereas data checking may refer to insuring that appropriate data is being analyzed for the model. For instance, data checking may include handling missing values and/or setting minimum and/or maximum values to remove outliers in the data. Variable reduction may refer to finding the best predictors of a target variable for use in the model and model estimation may encompass the generation of a model. After the model has been generated, various reports related to the model may also be generated.

With another aspect of the disclosure, each module configured to perform a specific task in the end-to-end modeling process may produce standardized output through standardized interfaces that may be easily accessed by other modules.

Other aspects of the disclosure facilitate the generation and maintenance of various model documents, including those required for model governance and risk compliance.

Aspects of the disclosure may be provided in a computer-readable medium having computer-executable instructions to perform one or more of the process steps described herein.

This Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

BRIEF DESCRIPTION OF THE DRAWINGS

The present invention is illustrated by way of example and is not limited in the accompanying figures in which like reference numerals indicate similar elements and in which:

FIG. 4b shows a second variable inventory screen that includes specific information about a given variable, including information about the variable definition, mapping, and availability, in accordance with one or more aspects of the disclosure.

FIG. 5 shows a sample set of computer-executable program instructions representing the derivation logic for a given variable, in accordance with one or more aspects of the disclosure.

FIG. 6 shows sample output produced by an enhanced modeling tool for implementing various types of data treatments, including treatments for handling missing values, in accordance with one or more aspects of the disclosure.

FIG. 7 shows a sample display screen that includes a list of independent variables correlated to a given dependent variable through various statistics in accordance with one or more aspects of the disclosure.

FIG. 10 shows a sample output generated by an enhanced modeling tool after running computer-executable program instructions for detecting interaction variables within a dataset for a sample model, in accordance with one or more aspects of the disclosure.

FIG. 11 shows a sample output displayed by an enhanced modeling tool after running computer-executable instructions for determining appropriate non-linear transformations of predictor variables in a sample dataset, in accordance with one or more aspects of the disclosure.

FIG. 12 shows a sample output generated by an enhanced modeling tool through the model creation process, in accordance with one or more aspects of the disclosure.

DETAILED DESCRIPTION

As discussed above, there are limitations with the tools available for supporting end-to-end model development.

In accordance with various aspects of the disclosure, methods, computer-readable media, and apparatuses are disclosed that allow an entity, such as a company, government agency, university, individual, group, etc., to use an integrated and standardized modeling solution for end-to-end statistical modeling of problems in any application space. In general, the modeling solution may facilitate the collection of relevant model data, checking of collected data, determining the best predictor variables from the collected data, creating the model, implementing the model, and/or validating the model.

To implement the modeling solution, the entity may use a computing device configured to run computer-executable program instructions related to each step of the modeling process. This computing device may increase modeling efficiency through automation, may provide easy access for modelers to various data sources, may facilitate several variable reduction techniques (e.g., for narrowing down lists of independent variables or predictors), and may provide various options for fine-tuning models to improve performance, including non-linear variable transforms, variable interactions, and model segmentation. The computing device may also provide standardized output, thereby greatly facilitating the preparation of extensive model documentation required for model governance and risk compliance, and may serve as a performance baseline for comparison with new modeling systems.

Figure 1:
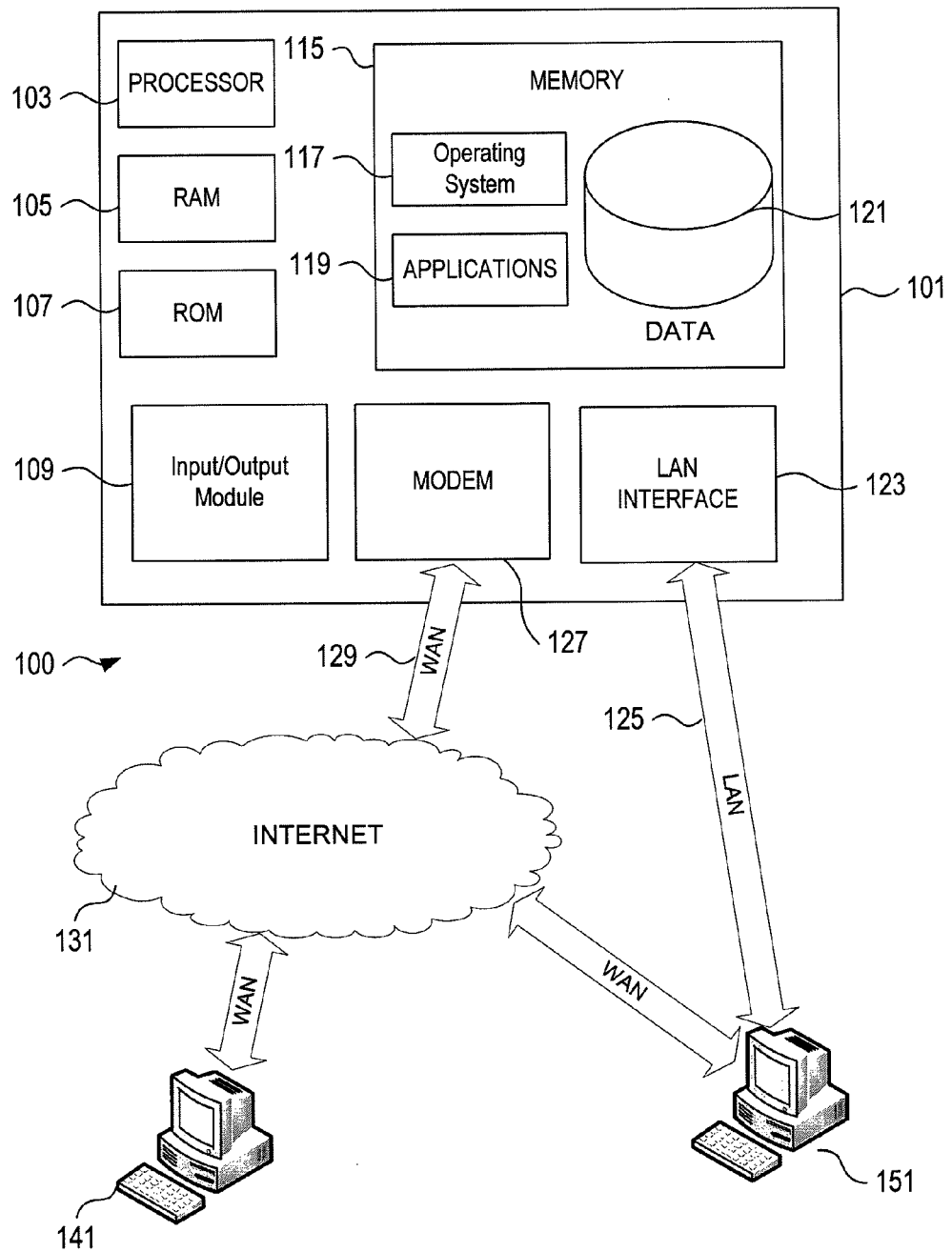
FIG. 1 shows an illustrative operating environment in which various aspects of the disclosure may be implemented.

FIG. 1 illustrates a block diagram of an enhanced modeling tool 101 (e.g., a computing server and/or device) in communication system 100 that may be used according to an illustrative embodiment of the disclosure. The tool 101 may have a processor 103 for controlling overall operation of the an enhanced modeling tool 101 and its associated components, including RAM 105, ROM 107, input/output (I/O) module 109, and memory 115.

I/O 109 may include a microphone, keypad, touch screen, and/or stylus through which a user of the an enhanced modeling tool 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various functions. For example, memory 115 may store software used by the device 101, such as an operating system 117, application programs 119, and an associated database 121. Processor 103 and its associated components may allow the device 101 to run a series of computer-readable instructions to estimate a model from data that has been collected and processed. For instance, processor 103 may select which predictor variables should be included in a given model based upon predefined rules. In addition, processor 103 may implement various rules for modifying collected data in preparation for use in the model.

The server 101 may operate in a networked environment supporting connections to one or more remote computers, such as terminals 141 and 151. The terminals 141 and 151 may be personal computers or servers that include many or all of the elements described above relative to the computing device 101. Alternatively, terminal 141 and/or 151 may be a data store that is used by enhanced modeling tool 101 to store data useful for the generation of various models. The network connections depicted in FIG. 1 include a local area network (LAN) 125 and a wide area network (WAN) 129, but may also include other networks. When used in a LAN networking environment, the server 101 is connected to the LAN 125 through a network interface or adapter 123. When used in a WAN networking environment, the server 101 may include a modem 127 or other means for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP and the like is presumed.

Additionally, an application program 119 used by the enhanced modeling tool 101 according to an illustrative embodiment of the disclosure may include computer executable instructions for invoking functionality related to automating the process of collecting and checking data in preparation for model creation.

Enhanced modeling tool 101 and/or terminals 141 or 151 may also be mobile terminals, such as smart phones, personal digital assistants (PDAs), etc. including various other components, such as a battery, speaker, and antennas (not shown).

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, and distributed computing environments that include any of the above systems or devices, and the like.

The disclosure may be described in the general context of computer-executable instructions, such as program modules, being executed by a computer. Generally, program modules include routines, programs, objects, components, data structures, etc. that perform particular tasks or implement particular abstract data types. The disclosure may also be practiced in distributed computing environments where tasks are performed by remote processing devices that are linked, for example, through a communications network. In a distributed computing environment, program modules may be located in both local and remote computer storage media including memory storage devices.

Figure 2:
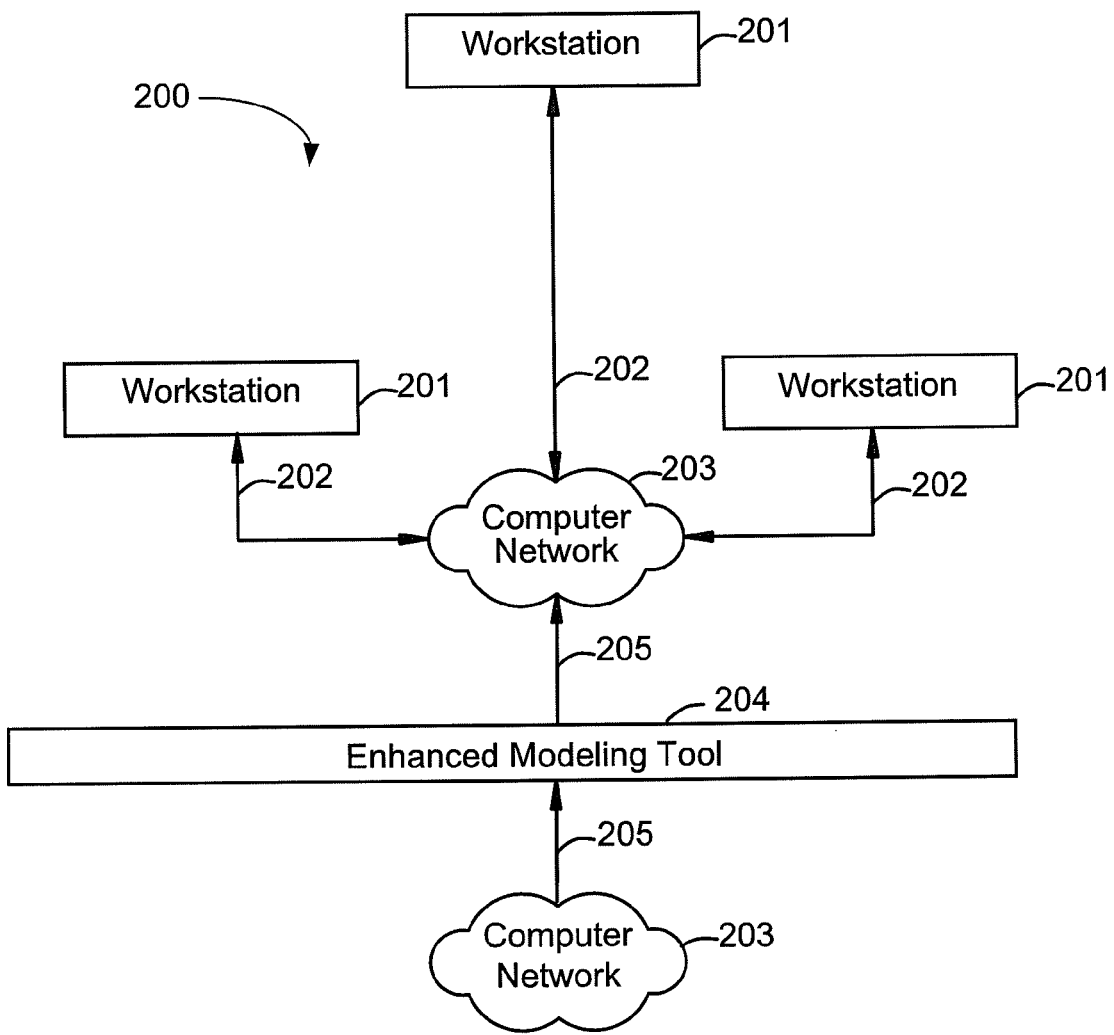
FIG. 2 is an illustrative block diagram of workstations and servers that may be used to implement the processes and functions of one or more aspects of the present disclosure.

Referring to FIG. 2, an illustrative system 200 for implementing methods according to the present disclosure is shown. As illustrated, system 200 may include one or more workstations/servers 201. Workstations 201 may be local or remote, and are connected by one or more communications links 202 to computer network 203 that is linked via communications links 205 to the enhanced modeling tool 204. In certain embodiments, workstations 201 may be different servers that store modeling data used by tool 204, or, in other embodiments, workstations 201 may be different points at which the enhanced modeling tool 204 may be accessed. In system 200, the enhanced modeling tool 204 may be any suitable server, processor, computer, or data processing device, or combination of the same.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

The disclosure that follows in the Figures may be implemented by one or more of the components in FIGS. 1 and 2 and/or other components, including other computing devices.

Figure 3:
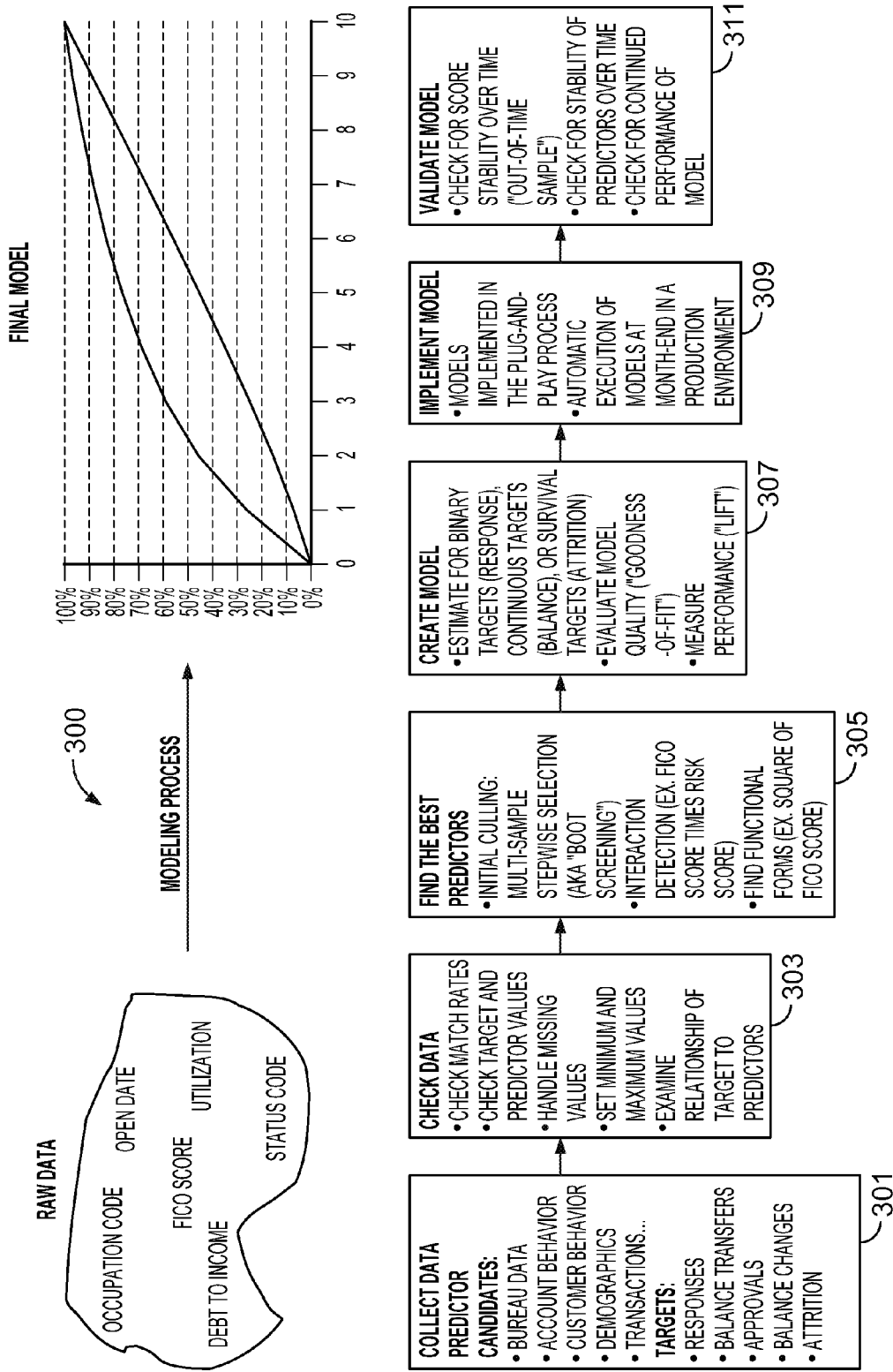
FIG. 3 is a flow diagram of steps performed by an enhanced modeling tool in an end-to-end standardized modeling process and specific tasks assigned to various components of the enhanced modeling tool within each step, in accordance with one or more aspects of the disclosure.

FIG. 3 shows a flow diagram of steps performed by enhanced modeling tool 204 in an end-to-end (e.g., from data gathering to model estimation) standardized modeling process and specific tasks assigned to various components of the enhanced modeling tool 204 within each step, in accordance with at least one aspect of the disclosure. The modeling process 300 may start out at step 301 where the enhanced modeling tool 204 may collect data associated with the model. The lifecycle of the modeling process managed by enhanced modeling tool 204 may also include checking the collected data at step 303, finding the best predictors at step 305, creating the model at step 307, implementing the model at step 309, and validating the model at step 311.

Data that is collected in step 301 by enhanced modeling tool 204 may be specific to a particular line of business within an organization (e.g., a company). For instance, an organization such as a financial institution may collect data from information bureaus (e.g., credit, etc.) by monitoring customer account behavior and other behavior, from analyzing demographics data, and by analyzing various customer transactions. The target of these data collection efforts may serve various needs of the organization such as a financial institution, including the modeling of response characteristics (e.g., for survey mailings, online questionnaires, etc.), balance transfers, approvals, balance changes and attrition. Enhanced modeling tool 204 may incorporate separate modules (e.g., processors, data storage units, etc.) for pulling data from multiple sources and creating a coding framework (e.g., in SAS, etc.) with relevant dependent and independent variables (e.g., various attributes or predictors) for model development. Also, data anomalies may be corrected in the collected data so that modelers do not have to correct the data themselves. As an example, a financial institution may have separate modules for pulling data for the credit card, small business, and deposit lines of business.

Also, the modules for pulling and managing data from various sources may accept user-defined options for the data pull. These modules may also hold logic for derived variables and may calculate the dependency relationship between derived variables and raw variables. The modules may also check corresponding available variable derivation logic. New derived variables may be created as enhanced modeling tool 204 gains more knowledge about target variables; thus, a particular predictor variable set used for modeling a target may be modified with new derived variables as enhanced modeling tool 204 analyzes new data. In other aspects, the data pull and management modules that are a part of enhanced modeling tool 204 may pull data for a relevant time period. In this way, the data pull and management module may adapt to a particular modeling scenario and retrieve only that data that is relevant to the time period that a model should consider. In addition, the modules may store metadata for raw and derived variables. Flags may be embedded in the metadata definition if special care needs to be taken with a particular variable. The centralized data pull and management module may output computer-executable program instructions for posterior steps of model building, such as special data treatment, derivation logic, metadata labeling (including variable definition and flags for special treatment), etc. The modules may also serve as a centralized online location for variable inventory management and query.

As mentioned earlier, enhanced modeling tool 204 may consider any number of independent variables (e.g., attributes or predictor variables) in creating a model. Examples of independent variables that may be considered (e.g., by a credit card line of business in a financial institution) include the date the last credit line was changed for a customer associated with an organization, the dollar value of the transactions from the past year for the customer, the total credit limit for the customer, the balance in a customer savings account, the quantity of online banking accounts for the customer, the number of cash transactions during a predetermined time period for the customer, the amount of a recent tax refund or payment associated with the customer, median value of a home owned by the customer, the number of months that have elapsed since the most recent credit card activity by the customer, and the number of times the customer has made daily bankcard inquiries.

Other independent variables that may be considered (e.g., by a small business line of business within a financial institution) include the number of times during the life of an account for a small business that the account has been billed, the amount of credit granted to the card-holder at the time when the account was last cycled, the past due amount on the principal for a mortgage payment associated with the small business, the amount of unavailable funds belonging to an account owned by the small business, the amount of a recent tax refund or payment associated with the small business, and the number of months that have elapsed since the most recent credit card activity by the customer.

As mentioned before, enhanced modeling tool 204 may generate data about each predictor variable from various sources, including data internal to an organization (e.g., customer account information, customer transaction information, personal identification information, etc.) and from various external sources. Internal data may also be generated from previous test cases that the organization may have implemented. For instance, in the case of an organization wanting to predict response rates to a survey mailing, various predictors may be determined through analysis of responses returned from one or more test mailings to a random population. In this example, the data generated may then be used to model customer behavior for better targeting future survey mailings. In addition, enhanced modeling tool 204 may allow modelers to create their own predictor variables, outside of the variables that may already exist in various data pull and management modules.

Figure 4A:
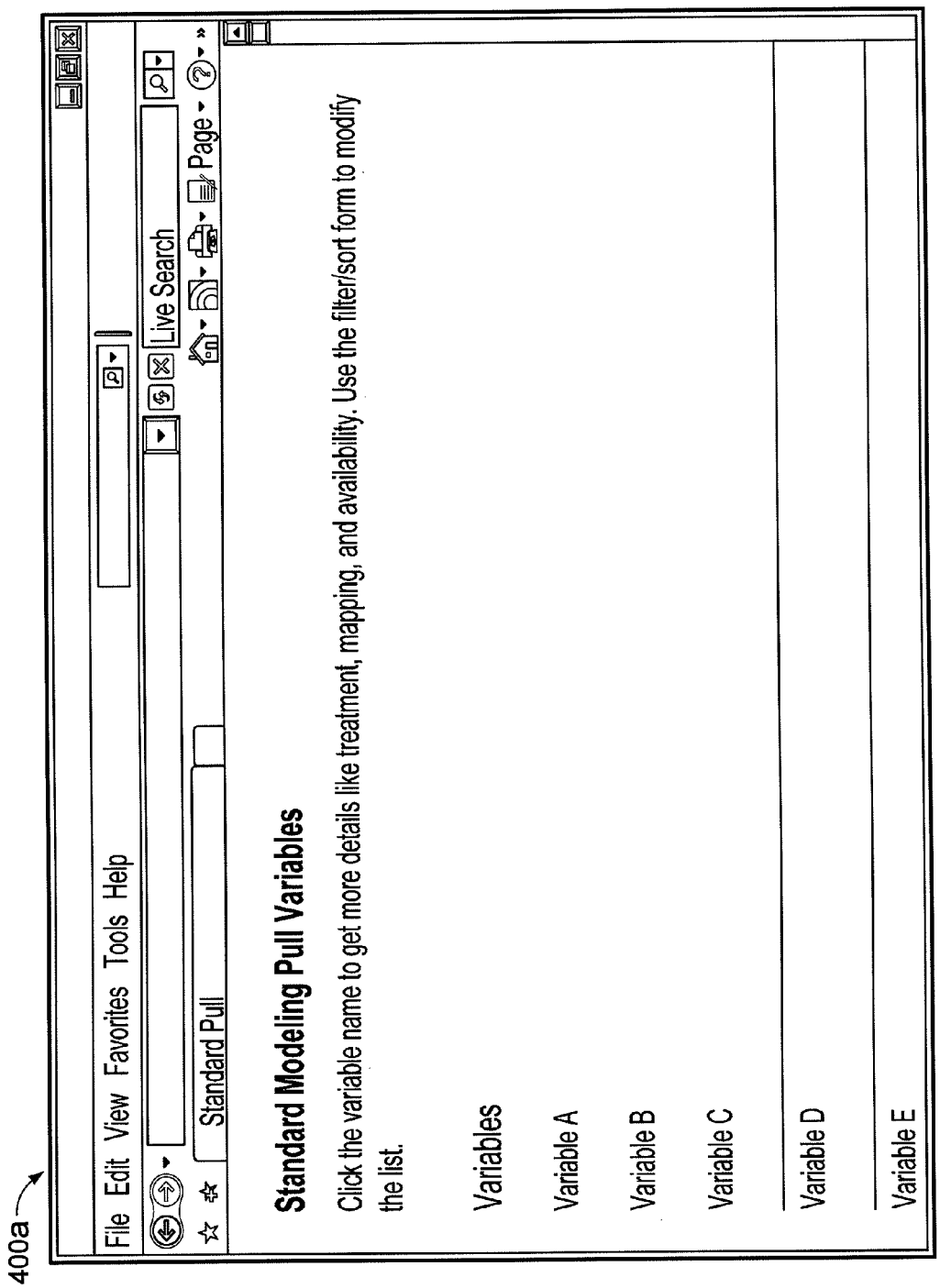
FIG. 4a shows a first variable inventory screen with a list of various variables that may be available to modelers through an enhanced modeling tool in accordance with one or more aspects of the disclosure.

Enhanced modeling tool 204 may also include a display device that displays an online variable inventory screen (e.g., a webpage) that may show information about all of the raw and derived variables. FIG. 4a shows a first variable inventory screen 400a with a list of various independent variables that may be available to modelers through enhanced modeling tool 204 in accordance with at least one aspect of the disclosure. The online variable inventory screen 400a may serve as a portal into a consolidated database for all the individual variables available to modelers. The webpage may include a search query to search variables by variable name, data source, etc. The screen may also include a link (e.g., a hyperlink) to obtain more detailed information for a given variable, including the variable definition, availability, format, source, etc. FIG. 4*b* shows a second variable inventory screen 400*b* generated by enhanced modeling tool 204; screen 400*b* includes specific information about a given variable, including information about the variable definition, mapping, and availability, in accordance with at least one aspect of the disclosure. For derived variables, the derivation logic may be displayed with all the dependency logic in screen 400*b*. The derivation logic based on raw variables may be defined on various computing platforms, such as via SAS code. Additional comments may wrap the logic with information indicating a type of derivation logic, definition, and dependency relationship. The wrapper may be processed by a parser to calculate the dependency relationship and to generate metadata labels. FIG. 5 shows a sample set of computer-executable program instructions 500 representing the derivation logic for a given variable, in accordance with at least one aspect of the disclosure.

Various aspects of the collected data may be checked in step 303 of FIG. 3. Here, the validity of the data attributes pulled in step 301 may be examined. For instance, the match rates, target values, and the predictor values may be checked. As not all accounts (e.g., in a financial institution) used to build a model may be matched to different data sources, enhanced modeling tool 204 may need to check the proportion of accounts that may be matched. The ratio of accounts that may be matched may be recorded and modelers may make a decision as to whether to include a given data source in the final model development effort. The target value may refer to the value that the model may need to predict. During the model production process, enhanced modeling tool 204 may append the target value (e.g., known historical data) to a dataset so that a model may be trained. Meanwhile, the predictor value may refer to an input of the model. The predictor values may be shown as a list of variables pulled by the data pull and management module of enhanced modeling tool 204.

In addition, enhanced modeling tool 204 may treat the raw data in various ways to prepare the data for use in a model. For instance, tool 204 may handle missing data values (e.g., by eliminating an attribute from the model, fill in missing values, creating dummy flags, etc.), may set minimum and maximum values for certain variables, may examine the relationship of the target to various predictors (e.g., are the predictor variables relevant to the target variable of the modeling effort?), and may normalize certain variables. In one embodiment, enhanced modeling tool 204 may attempt to set the minimum and maximum values for variables at the 0.5 and 99.5 percentile values, respectively; similarly, missing values may be filled with the median (or mean) value. Also, enhanced modeling tool 204 may reject duplicate or nearly duplicate (or highly correlated) predictor variables (e.g., customer account balance and customer statement balance) to prevent the model from being unstable. FIG. 6 shows sample output produced by enhanced modeling tool 204 for implementing various types of data treatments, including treatments for handling missing values, in accordance with at least one aspect of the disclosure.

In certain aspects, the enhanced modeling tool 204 may implement various rules for automatically rejecting a candidate predictor variable. For instance, tool 204 may reject a candidate predictor variable when all variable values are the same value, when more than 35% of the variable values are missing in the sample, when only two bins (e.g., groupings of values created for smoothing purposes) are created for the variable and one of the bins contains less than 0.25% of the sample, when only two bins are created for the variable and one of the bins has missing values and the other bin has only one value, and when a given predictor variable is 95% correlated with an other predictor variable.

Figure 8:
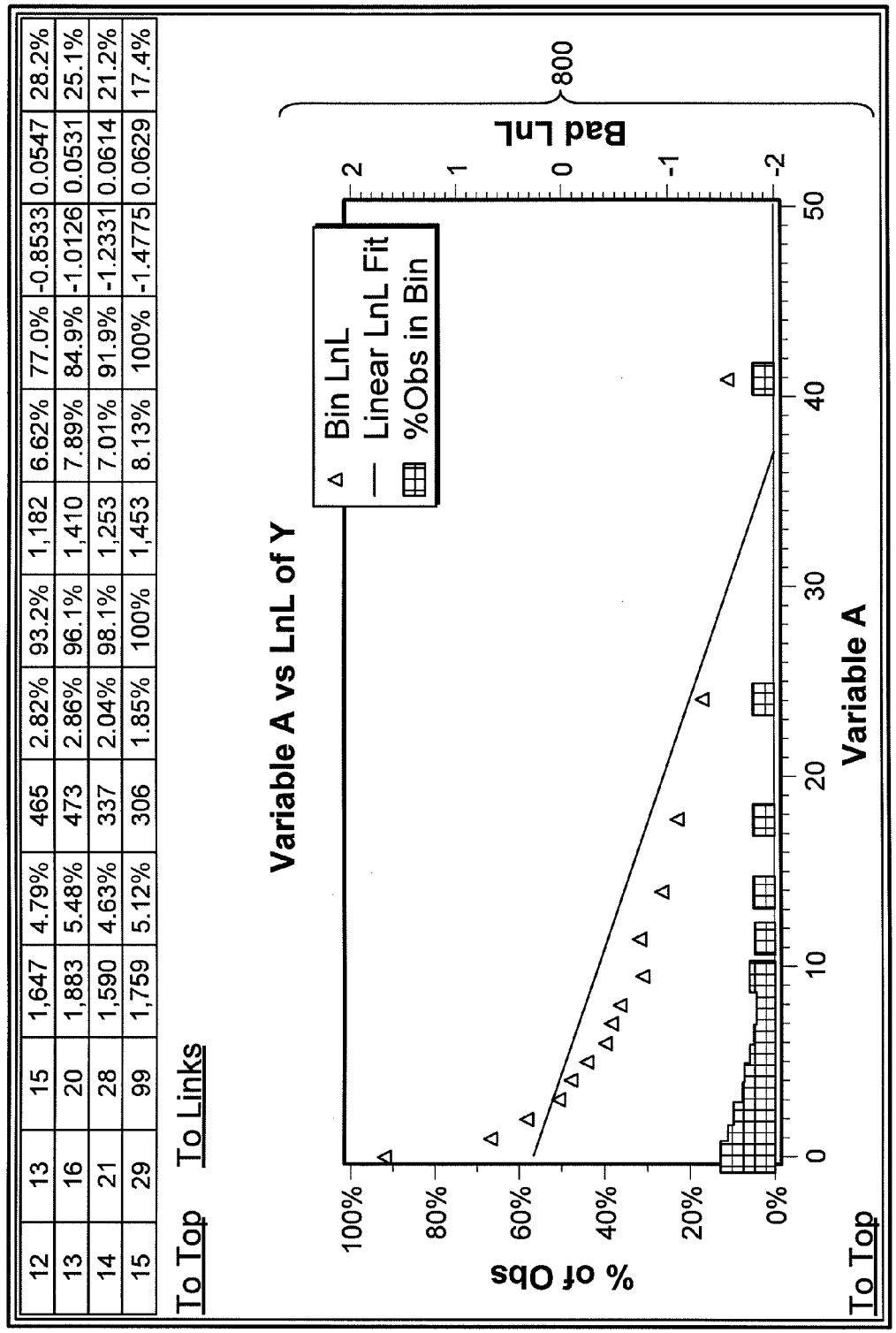
FIG. 8 shows a sample graph that correlates an independent variable to a target variable in accordance with one or more aspects of the disclosure.

In addition, the enhanced modeling tool 204 may analyze the relationship between the predictor variables and the target variable on multiple metrics. Various statistics (e.g., Chi-squared statistic, information value, K-S statistic, average lift, R-squared, etc.) may be used to understand the correlation of the predictor variables with a given target variable. The results of the statistics may be used to add/remove predictor variables as candidates for use in a given model. Enhanced modeling tool 204 may display the output of this analysis online to allow multiple users to interactively view the results. The data may be output as a list of variables and the corresponding statistics analyzed for these variables. FIG. 7 shows a sample display screen 700 generated by enhanced modeling tool 204; display screen 700 includes a list of independent variables 701 correlated to a given dependent variable through various statistics, in accordance with at least one aspect of the disclosure. As shown in FIG. 7, links (e.g., hyperlinks) may allow users to click on a particular variable for access to more information about the variable, such as graphs that detail the predictor variable's predictive power with respect to a given target variable. FIG. 8 shows a sample graph 800 generated by enhanced modeling tool 204; graph 800 correlates an independent variable to a target variable in accordance with at least one aspect of the disclosure. In the example of FIG. 8, there is a negative correlation between the independent and dependent variables. Although the data in FIG. 8 is binned, the graphs generated by enhanced modeling tool 204 may or may not display data in a binned format. Also, users may choose a specific statistic on which to rank the list of variables that are displayed on the display screen.

For this analysis, the target variable may be binary or continuous. The predictor variables may be numeric or character-based and the dataset underlying any given variable may contain missing values. The statistical analysis may be performed with or without any of missing values treated with any of the techniques mentioned earlier. The predictor variables may be ranked by the association measure (e.g., statistic) with the target where the predictor has been binned by a predetermined amount. As mentioned earlier, the association measures for binary targets may include K-S, maximum likelihood Chi-squared p-value, information value, and average lift, among others. The association measure for a continuous target may be R-squared, among others.

As mentioned earlier, enhanced modeling tool 204 may generate a standardized output (e.g., in HTML) after the data has been treated; this standardized output may be directly included in future steps of the modeling process. In particular, HTML pages may be created and stored in a datastore associated with enhanced modeling tool 204 and accessed by users by navigating to a start page with a predetermined uniform resource locator (URL). In some embodiments, a link to the start page may be e-mailed to a modeling team member when the enhanced modeling tool 204 completes its analysis or the link may be accessed by opening a log file generated by the enhanced modeling tool 204. The output may be viewed in both text and graphical form.

In step 305, the enhanced modeling tool 204 may determine the best predictor variables for a given target variable. Here, the enhanced modeling tool 204 may allow for predictor variable preselection appropriate for a given model, especially in situations where the number of candidate predictor variables is too large to perform correlation analysis with the target variable, one predictor variable at a time. In this way, enhanced modeling tool 204 may serve as a model building automation tool for automating the existing best practices to be able to use across different modeling teams in a well-organized fashion.

As an example of how this step is implemented, if the target of the modeling process is to model the response rate of a survey mailing, potential predictors may include gender, age, marital status, etc. The best predictors from the total set of variables may initially be culled in a multi-sample stepwise selection process (e.g., by "boot screening" or "boot strapping"). In addition, the enhanced modeling tool 204 may determine the best predictor variables for a particular target through interaction detection (e.g., the interaction of two or more predictors to arrive at a derived variable), and/or may find the best functional form of appropriate variables (e.g., the square of a variable, the negation of the variable, etc.). An example of a technique used to determine the best functional form of appropriate variables may be found in "Regression using Fractional Polynomials of Continuous Covariates: Parsimonious Parametric Modeling" (Royston, Altman in Applied Statistics, 43, #3). Unlike the technique discussed in this reference, enhanced modeling tool may implement a model inclusion test for each predictor.

For instance, in the example of modeling the response rate of a survey mailing, an initial survey mailing may be used to populate a centralized data pull and management module of the enhanced modeling tool 204 with the appropriate variables. Assume that three of these predictor variables are the age of the survey responder, the age of the oldest child in the responder's family, and the credit score of the survey responder. In analyzing the data, enhanced modeling tool 204 may determine that a derived variable (such as age of the survey responder minus the age of the oldest child) may be a good predictor of whether or not the candidate survey responder actually responds to the survey. Thus, this derived variable may be created and may be made available to the modeler in generating the model. Similarly, enhanced modeling tool 204 may determine that the square of the candidate survey responder's credit score (rather than the score itself) would be a better predictor of whether or not any given candidate responder actually responds to the survey. Thus, this functional form (e.g., the square of the credit score) may be made available to the modeler in generating the model.

As mentioned above, the enhanced modeling tool 204 may select the most powerful candidate predictors using a stepwise selection of multiple data samples. For instance, if the dataset for a model includes 10,000 data samples, enhanced modeling tool 204 may select a random subset of the entire set (e.g., 10% of the total number of samples=1000 samples), and may build a rough model on this data set. In this example, this process may be repeated 10 times with 10 random samples. During each run, tool 204 may analyze if a given candidate predictor variable is present in the random sample and how (if any) the predictor variable is correlated to the dependent target variable. Those predictor variables that appear most frequently in the data sample and are most strongly correlated to the target variable during each run may then be selected as the most powerful candidate predictors.

Figure 9:
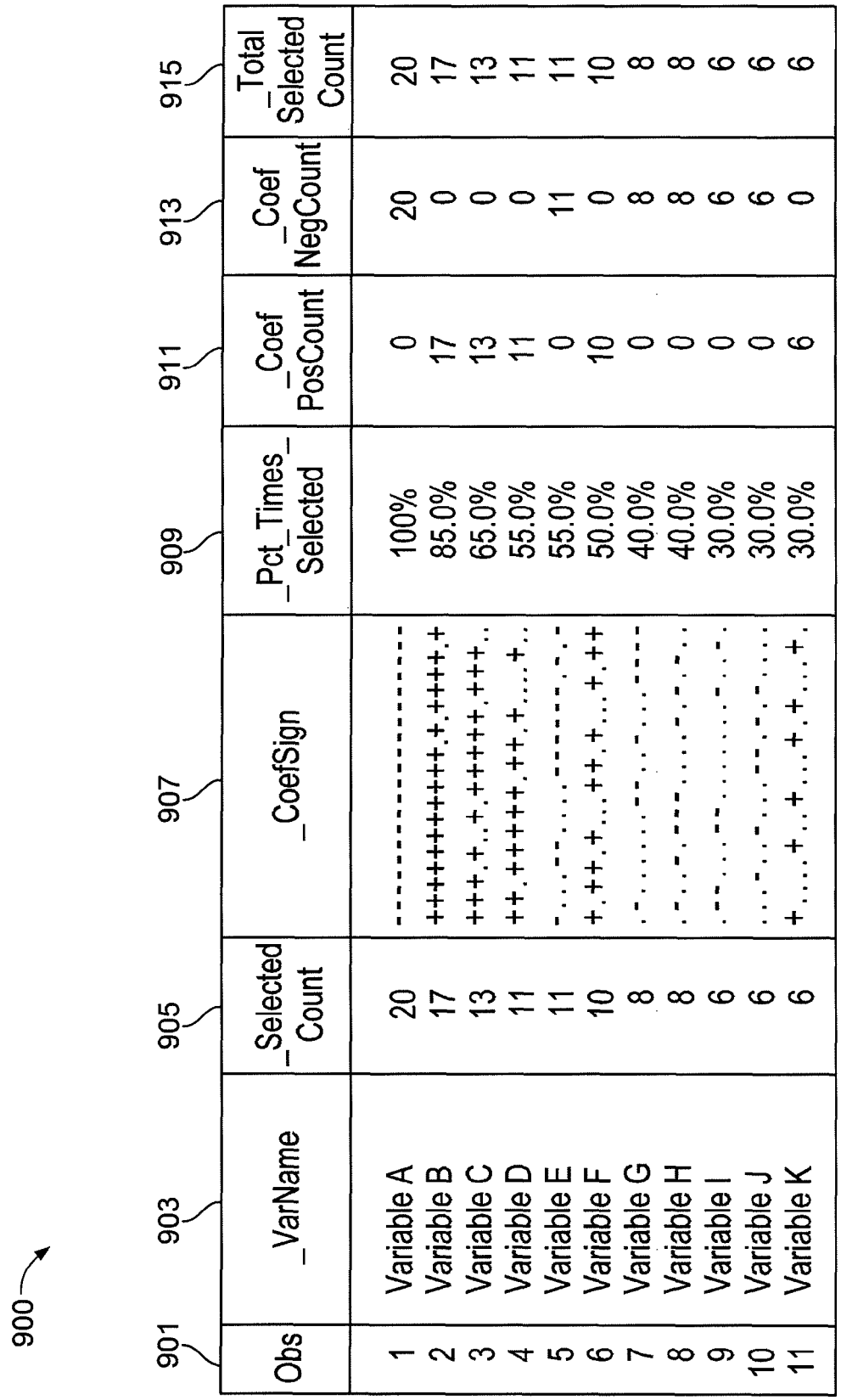
FIG. 9 shows a sample display output table generated by an enhanced modeling tool for determining the best predictors in accordance with one or more aspects of the disclosure.

FIG. 9 shows a sample display output table 900 generated by enhanced modeling tool 204 for determining the best predictors in accordance with at least one aspect of the disclosure. Table 900 includes a run number column 901, a predictor variable column 903, columns 905 and 915 detailing the number of times the corresponding predictor variable was selected in the sample run, column 907 detailing how the corresponding predictor variable correlated to the dependent variable if the predictor was selected during the run (in this example, "+" indicates a positive correlation, "−" indicates a negative correlation and "." indicates that the predictor was not selected in the sample run but any number of symbolizations may be used), column 909 indicating the percent of times that a given candidate predicator was selected in the set of runs (here, 20 runs), column 911 indicating the number of times that a positive correlation was present in the set of runs, and column 913 indicating the number of times that a negative correlation was present in the set of runs. This output may be used in conjunction with the output shown in FIGS. 7 and 8.

Tool 204 may implement predictor selection with logistic/linear regressions and/or survival analysis (e.g., for binary, continuous, and/or censored duration targets.) The size and the number of samples in the boot screening process, the stepwise parameters, and the amount of stepwise output may be set by a user. Tool 204 may assume that all variables used for model estimation are numeric and have no missing values. As shown in FIG. 9, tool 204 may display the size of the samples, the number of times a predictor was selected, and the sign of the selected predictor's coefficient. Here, the number of times that a predictor is selected may be counted as the number of times that the predictor is retained by the stepwise selections where the coefficient sign is the same. A list of predictors, ordered by the number of times selected, may also be printed. This list may be directly used for proceeding steps of the modeling process.

Enhanced modeling tool 204 may also evaluate the potential for model tuning and/or incremental model performance from segmentation. In this regard, tool 204 may seek fruitful segmentation paths, early in the model building process or tool 204 may determine whether segmentation may be fruitful at all. This process may be particularly useful when different parts of an underlying population have different characteristics. For instance, to extend the above example of a response rate associated with a survey mailing, suppose that the behavior of males and females are different with regard to survey responses. In this case, instead of trying to use a common set of attributes to predict behavior of both males and females (thereby resulting in a suboptimal result), separate models may be built for males and females, with each model segmented with a different set of attributes.

In addition, tool 204 may handle sample segmentation by creating cut points based on the binned values of a candidate variable (numeric variables may be binned using computer-readable instructions and character variables may be handled by assigning one bin to each unique value). In this aspect, tool 204 may quickly build segmentation models and may compare their performance against the performance of an un-segmented model built with the same quick methods. The tool 204 may evaluate segmentation for logistic as well as ordinary least squares (OLS) models.

During the segmentation process, the predictor set may be reduced to a smaller set of factor variables before the models may be estimated. Reducing the predictor set to a smaller set of factor variables may reduce the time spent on stepwise estimation while preserving most of the predictor variance. Tool 204 may more easily detect structural differences between segmented models (an indicator that segmentation may be warranted) when the predictors are orthogonal factors, rather than potentially collinear raw predictors. In addition, tool 204 may use various techniques to select factors (e.g., dimensional reduction). Tool 204 may keep factors whose eigenvalue is greater than or equal to 1 or tool 204 may keep factors up to the point where the eigenvalue curve flattens in a scree plot.

In other aspects, enhanced modeling tool 204 may evaluate the potential for incremental model performance (logistic and OLS) through the creation of interaction variables. Interaction variables may be variables that represent the interaction terms between two separate raw variables (e.g., if two raw variables are marital status and age, an interaction variable may represent the intersection of being married and age 20-30). Here, the search for interaction variables may be one-pass or "boot-screened" (search for interactions in several subsamples). The search time may grow exponentially as the number of interactions and bins increase. The predictors may be limited to around 20 and the bins may be limited to 5 to keep the estimation time tractable. FIG. 10 shows a sample output 1000 generated by enhanced modeling tool 204 after running computer-executable program instructions for detecting interaction variables within a dataset for a sample model, in accordance with at least one aspect of the disclosure. As shown in FIG. 10, output 1000 may display the selected interactions (and counts if the selections are boot-screened). A file with computer-readable instructions required to create the significant interaction variables may also be created for use in proceeding modeling steps.

In yet other aspects, enhanced modeling tool 204 may evaluate the potential for an incremental model performance increase from non-linear transformations of the predictor variables. In this regard, enhanced modeling tool 204 may search for the best predictor functional forms (e.g., log of X, square of X, or both) from a list of candidate predictor variables) and may test each candidate predictor to see if the candidate predictors should be included in the model. After completing this process, enhanced modeling tool 204 may cause display of an output that shows selected transformations for each predictor as well as which predictors were dropped. FIG. 11 shows a sample output 1100 displayed by enhanced modeling tool 204 after running computer-executable instructions for determining appropriate non-linear transformations of predictor variables in a sample dataset, in accordance with at least one aspect of the disclosure. The generated code shown in FIG. 11 may be compatible with any number of programming platforms, including SAS. For example, FIG. 11 displays SAS computer-executable program instructions to create the selected variable transformations for use inside an SAS data step, as generated by enhanced modeling tool 204.

Each variable may be tested sequentially for each transformation in the presence of all the other predictor variables. Additionally, the predictor variables may be tested to see if it should be included at all. Although any number of terms may be introduced in the transformation function, in some embodiments, transformations may be one and two-term transformations (e.g., f(X) may be $X^2$ or f(X) may be $X^2$ and ln(X)). Two coefficients, one for each transformation, may be estimated in the case of two-term transformations.

When enhanced modeling tool 204 finds the best transformation for a variable, this transformation may be fixed and used during the functional form search of subsequent variables. Although any number of transformations may be implemented, in some embodiments, the functions used for the predictor transformation may be $X^{-2}$ (=$1/X^2$), $X^{-1}$, $X^{-0.5}$, ln(X), and/or X (linear, no transformation), $X^{0.5}$, $X^2$, and $X^3$ (where X represents a given predictor variable). In some embodiments, the best transformation and predictor inclusion may be determined by Chi-squared significance tests that compare alternative model Log-Likelihoods (LnL). For each tested predictor, the best of the one-term LnLs may be compared against the best two-term LnL, against the model where the current X is untransformed, and against the model LnL where X is completely omitted.

In certain aspects, enhanced modeling tool 204 may transform categorical variables into numerical variables, as well as transforming continuous numerical variables in a way that non-linearity between the target variable and predictor variables be eliminated.

Also, in certain aspects, a point and click tool may be used to add more detail to a dataset and find the best predictors for a given model.

The modeling process may then move to step 307 of FIG. 3 where a model may be created based on the predictors determined in step 305. Many different target variables may be modeled, including binary response targets (e.g., estimation of the ability to get a response back for a solicitation done in a direct mail or telemarketing campaign, etc.), continuous targets (e.g., predicting account balances, etc.), and survival targets such as a customer attrition estimation (e.g., discontinuing a business relationship with an organization, attrition associated with a response rate to a survey over time, etc.) and/or a breakage estimation. A breakage estimation may comprise an analysis of levels of cost associated with a service provided by an organization. For instance, if a financial organization provides a cash rewards program over a predetermined time period for maintaining a credit card with the organization, the breakage analysis may investigate the cost of providing the rewards so that the financial organization can create an appropriate budget. This approach may estimate logistic as well as OLS models (e.g., logistics regression (predicting account balances, etc.), linear regression (e.g., predicting a response for a direct mail campaign, etc.), and/or survival analysis).

Step 307 may be highly automated and yet give modelers the flexibility to provide various types of input. For instance, enhanced modeling tool 204 may automatically compute the equation underlying the model, may automatically follow the correct output format (e.g., SAS), and may automatically display (e.g., via a text-based report) the various modeling parameters (e.g., distributions, goodness-of-fit, variance inflation factor (VIF), predicted versus actuals, etc.). The VIF may also be reported for model governance. FIG. 12 shows a sample output 1200 generated by enhanced modeling tool 204 through the model creation process of step 307, in accordance with at least one aspect of the disclosure. FIG. 12 shows the output score card with equation 1201 generated by enhanced modeling tool 204 based on the predictors selected (used for production purposes so that modelers may not need to categorize their own scorecard). The scorecard may refer to the final equation of the model or the programming code that includes the mathematical algorithm behind a model. In this way, the modeling process 300 may be represented as a mathematical algorithm, equation, or other process. The modeling process 300 may be implemented in a predetermined programming language and embedded in a general production environment.

In addition, enhanced modeling tool 204 may create a random development/holdout dataset split. More specifically, enhanced modeling tool 204 may use historical data to find out the correlation between variables and may use mathematical methods to formalize this correlation. Enhanced modeling tool 204 may then apply the mathematical algorithm obtained based on historical data to predict future values of variables. In this case, the development sample may refer to the historical data and a holdout sample may be a set of data homogenous to the development sample. When a model is in production, the model may be applied to the holdout sample to observe the performance so that the model will work well on this sample. Further, the estimation of coefficients may be done either in a single pass on the entire development dataset or may be "boot-strapped" from multi-sample estimations.

Bootstrapping results may provide some insight into the stability of the model through the observation of the coefficients from multiple runs.

Enhanced modeling tool 204 may also support the use of a weight variable for logistic and OLS models. More specifically, in certain statistical models, it may be possible to twist a population from the natural representation so that the model will achieve the best performance. In these cases, enhanced modeling tool 204 may use a weight variable (e.g., as in estimation weighting) to record the transformation of the sample population so that when the model is built, the result may not be skewed. Further, down-sampled datasets may be weighted back to their natural proportions.

In addition, some two-step models may be reduced to a one-step model using the weighted logistic approach. As an example, a one-step model may be a model based purely on customer behavior data obtained from a data mart. Sometimes, a one-step model may not capture the complicated behavior of customers. In these cases, enhanced modeling tool 204 may build several one-step models to model different customer behavior and combine them together to produce a two-step model. Also, enhanced modeling tool 204 may evaluate co-linearity between model predictors via the correlation matrix and/or variance inflation factor (VIF).

As part of step 307, enhanced modeling tool 204 may output model performance on both the development and holdout datasets (e.g., via lift tables). The output may also show statistical measures of model performance, the profile of predictor variables by decile (or any user defined bin), the profile of additional variables by decile (or any user defined bin), and a text file (e.g., a .CSV file) to serve as a data input to an automatic model report module (part of enhanced modeling tool 204) for generating model development documentation required by model governance and compliance departments/rules etc. In addition, enhanced modeling tool 204 may generate computer-executable program instructions related to scoring and decile cut points.

Figure 13:
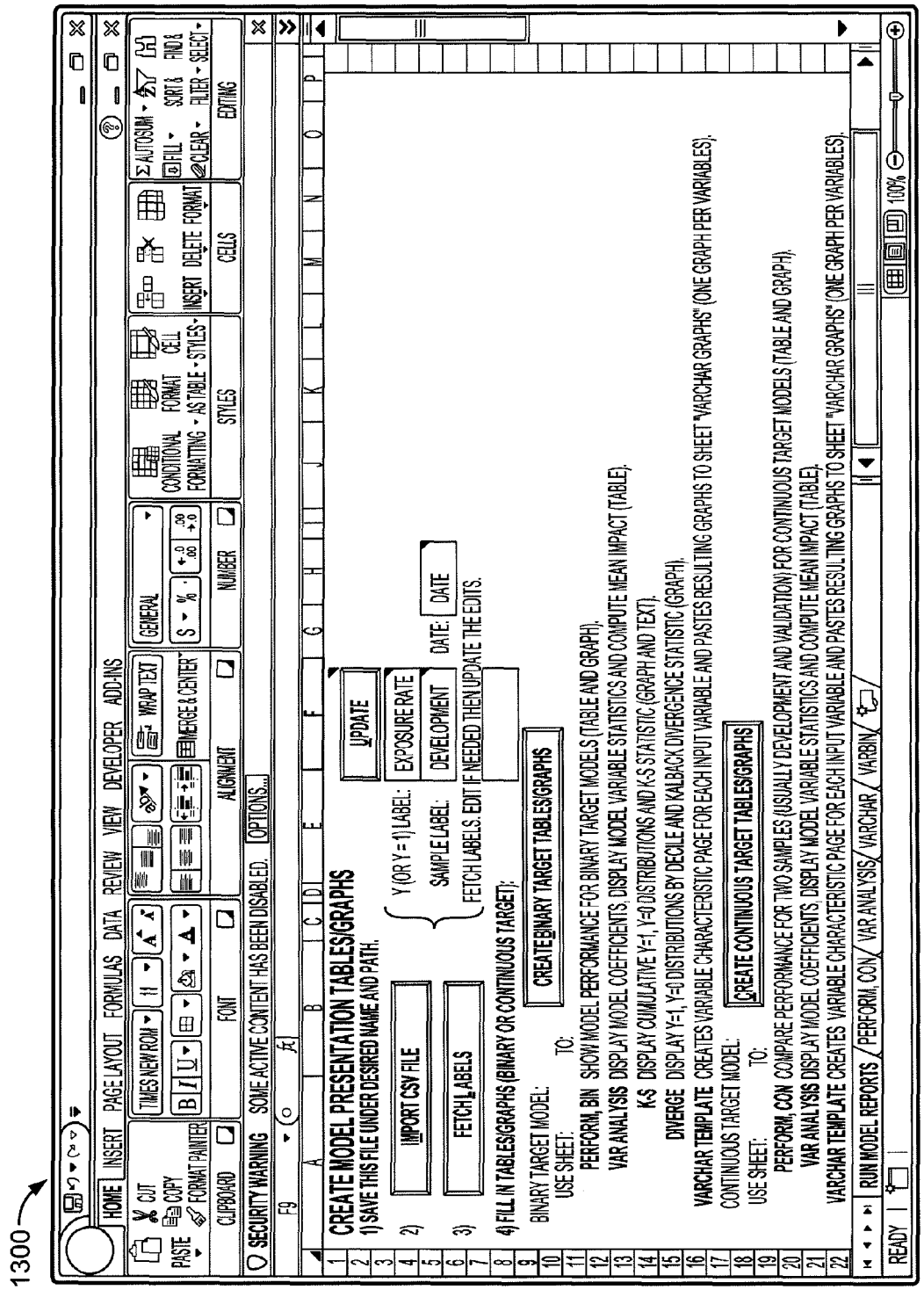
FIG. 13 shows a sample screen displayed by an enhanced modeling tool for generating charts and graphs related to model development and governance, in accordance with one or more aspects of the disclosure.

The automatic model report module mentioned may be a part of enhanced modeling tool 204 and may be an excel-based visual basic (VBA) application. This reporting module may take the output of the model (e.g., a .CSV file), perform various auditing functions on the output, and may automatically generate formatted charts and tables (e.g., related to model development, governance, and/or risk compliance) with a button click. FIG. 13 shows a sample screen 1300 displayed by enhanced modeling tool 204 for generating charts and graphs related to model development and governance, in accordance with at least one aspect of the disclosure.

In step 309, enhanced modeling tool 204 may implement the model created in step 307. In certain aspects, the model may be implemented in a plug -and play process. In addition, the model may be executed at the end of a predetermined time period (e.g., daily, weekly, monthly, etc.) in a production environment.

Finally, in step 311, enhanced modeling tool 204 may validate the model through various mechanisms. In some aspects, enhanced modeling tool 204 may check for score stability over time, stability of predictor variables over time, and for continued performance of the model. More specifically, when a model is produced and put into a production environment, the model may fail for various reasons, including data issues and issues related to changes in the underlying customer behavior. Both of these issues may be related to model stability. The enhanced modeling tool 204 may ensure that the model score is not disrupted by abrupt data problems.

In certain aspects, the various steps 301-311 of FIG. 3 may be performed by different or the same computing modules (e.g., servers) that comprise enhanced modeling tool 204. If different computing elements are used for each step, each computing element may produce an output that is standardized for use by other computing elements (e.g., via standardized output/input file formats, through standardized file wrappers, etc.).

Moreover, submodules (e.g., those for modeling binary targets, continuous targets, and/or performing a survival analysis, etc.) within a module may all produce uniform outputs that may be understood by each submodule. In particular, the enhanced modeling tool 204 may include modules that communicate via various software platforms, including SAS, VBA, Perl, HTML, and JAVA, among other platforms.

In certain aspects, the processes discussed herein may be implemented through a standard modeling code library, that when executed through enhanced modeling tool 204, provides end-to-end support for model development. In this way, tool 204 may ensure that robust statistical techniques are used for model development; in addition, tool 204 may enable modelers to pull data from multiple data sources and consolidate the data into a single dataset for model development. Tool 204 may implement computer-executable program instructions in a standardized code format to increase efficiency on model development while simultaneously providing modelers with the flexibility to be creative. In addition, enhanced modeling tool 204 may improve efficiency of not just the model development process but also of the model documentation process through standardized output. Ultimately, tool 204 may serve as a robust baseline model for benchmarking against new techniques.

In certain aspects, the modeling process 300 may be a hybrid solution that allows individual modelers the chance to code their own solutions and, at the same time, use an integrated end-to-end modeling solution. The process 300 may formalize modeling standards that are internal to an organization and may allow modelers the flexibility to go outside the system and modify the standards or add their own processes.

Aspects of the invention have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the invention.

What is claimed is:

1. A non-transitory computer-readable storage medium having computer-executable program instructions stored thereon that when executed by a processor, cause the processor to perform steps comprising:
   (i) collecting data from a plurality of sources, wherein the collected data includes data related to a plurality of independent variables;
   (ii) storing the collected data;
   (iii) performing a plurality of checks on the collected data, wherein the plurality of checks include handling missing values, eliminating outlier values, and eliminating highly correlated independent variables in the collected data;
   (iv) analyzing the checked data to determine one or more of the plurality of independent variables to be used in predicting a target variable;
   (v) generating a model to estimate the target variable using the determined independent variables; and (vi) generating a plurality of graphs related to governance and risk compliance of the model, wherein the plurality of graphs include a variance inflation factor.

2. The computer-readable storage medium of claim 1, wherein the plurality of sources includes customer account information and transaction information.

3. The computer-readable storage medium of claim 1, wherein the data include data relevant to credit card, small business, and deposit lines of business.

4. The computer-readable storage medium of claim 1, wherein the plurality of independent variables includes derived variables derived from at least two of the plurality of independent variables.

5. The computer-readable storage medium of claim 1, wherein the processor further performs: displaying an inventory screen with a listing of all of the plurality of independent variables that are available for modeling purposes.

6. The computer-readable storage medium of claim 5, wherein the processor further performs: displaying derivation logic for derived variables that are derived from multiple independent variables on the inventory screen.

7. The computer-readable storage medium of claim 1, wherein the missing values are handled by filling in the missing values with a median value for one of the plurality of independent variables.

8. The computer-readable storage medium of claim 1, wherein the outlier values are defined as values that are below a 0.5 percentile or above a 99.5 percentile for each of the plurality of independent variables.

9. The computer-readable storage medium of claim 1, wherein the plurality of checks further include eliminating one of the plurality of independent variables from inclusion in the model when more than 35% of values for the one of the independent variables are missing.

10. The computer-readable storage medium of claim 1, wherein the processor further performs: ranking the plurality of independent variables for predictive power by boot screening the plurality of independent variables.

11. The computer-readable storage medium of claim 1, wherein the determining further comprises: determining interaction variables from interaction of at least two of the plurality of independent variables.

12. The computer-readable storage medium of claim 1, wherein the processor further performs: segmenting the plurality of independent variables to generate two separate models from the data.

13. The computer-readable storage medium of claim 1, wherein the determining further comprises: determining which functional form of the plurality of independent variables should be used in the model, wherein the functional forms of the plurality of independent variables are created through non-linear transformations of the plurality of independent variables.

14. A computer-assisted method comprising:
collecting data from a plurality of data sources, wherein the collected data includes data related to a plurality of independent variables;
storing the collected data in a datastore associated with a computer;
using a processor associated with the computer, performing a plurality of checks on the collected data, wherein the plurality of checks include replacing missing values in the collected data with a median value of one of the plurality of independent variables, removing outlier values that are below a 0.5 percentile or above a 99.5 percentile for each of the plurality of independent variables in the collected data, and normalizing each of the plurality of independent variables;
using the processor, analyzing the checked data to identify a subset of the plurality of independent variables for inclusion in a model for a dependent variable, wherein the analysis includes transforming categorical variables into numerical variables;
using the processor, generating the model using the identified subset of independent variable; and
using the processor, generating a plurality of graphs related to governance and risk compliance of the model, wherein the plurality of graphs include a variance inflation factor.

15. The computer-assisted method of claim 14, wherein the dependent variable is either a binary variable or a continuous variable.

16. The computer-assisted method of claim 14, wherein the model is chosen from the group consisting of: a linear regression, a logistic regression, and a survival analysis.

17. An apparatus comprising:
one or more processors;
a memory storing a program of instructions for:
a data collection module configured to collect data from a plurality of sources, wherein the collected data includes data related to a plurality of independent variables;
a data checking module configured to perform a plurality of checks on the collected data, wherein the plurality of checks include filling in missing values in the collected data with a median value of one of the plurality of independent variables, removing outlier values, removing highly correlated independent variables, and normalizing at least one of the plurality of independent variables;
a data analysis module configured to identify a first subset of the plurality of independent variables for inclusion in a model for a dependent variable by correlating at least one of the plurality of independent variables with the dependent variable through a plurality of statistics, wherein the data analysis module is further configured to transform categorical variables into numerical variables;
a data reduction module configured to identify a second subset of strongest independent variables from the first subset by boot screening the first subset of the plurality of independent variables; and
a modeling module configured to estimate the model based on the identified second subset of strongest independent variables and generate a plurality of graphs related to governance and risk compliance of the model, wherein the plurality of graphs include a variance inflation factor.

18. The apparatus of claim 17, further comprising: a data segmentation module configured to segment the plurality of independent variables for use in at least two separate models.

19. The apparatus of claim 17, further comprising: a data transformation module configured to find a most predictive functional form of each of the plurality of independent variables.

* * * * *

UNITED STATES PATENT AND TRADEMARK OFFICE
CERTIFICATE OF CORRECTION

PATENT NO. : 8,583,408 B2
APPLICATION NO. : 13/050086
DATED : November 12, 2013
INVENTOR(S) : Kasilingam B. Laxmanan et al.

It is certified that error appears in the above-identified patent and that said Letters Patent is hereby corrected as shown below:

In the Claims

In Column 16, Claim 14, Line 12:
  Please delete "variable" and replace with --variables--

In Column 16, Claim 17, Line 26:
  Please delete "¶" after module

Signed and Sealed this
Twenty-fourth Day of February, 2015

Michelle K. Lee
*Deputy Director of the United States Patent and Trademark Office*